United States Patent [19]

Miller et al.

[11] Patent Number: 5,581,472
[45] Date of Patent: Dec. 3, 1996

[54] METHOD AND APPARATUS FOR FEEDBACK OF TRAINLINE STATUS TO THE CENTRAL PROCESSOR OF A LOCOMOTIVE THROTTLE CONTROLLER

[75] Inventors: Craig A. Miller; Paul J. Kettle, Jr., both of Pittsburgh, Pa.

[73] Assignee: Westinghouse Air Brake Company, Wilmerding, Pa.

[21] Appl. No.: 340,239

[22] Filed: Nov. 16, 1994

[51] Int. Cl.$^6$ ........................................ B61C 9/00
[52] U.S. Cl. ........................ 364/484; 123/399; 104/160; 105/61
[58] Field of Search ........................ 327/100, 101, 327/113, 114, 117; 364/484; 104/152; 105/61; 318/87, 107–110, 140; 246/167 R, 38, 187 R, 187 A, 187 B, 217; 123/399

[56] References Cited

U.S. PATENT DOCUMENTS

| | | | |
|---|---|---|---|
| 3,696,758 | 10/1972 | Godinez et al. | 105/61 |
| 3,715,579 | 2/1973 | Eblovi . | |
| 3,794,834 | 2/1974 | Auer, Jr. et al. . | |
| 3,805,056 | 4/1974 | Birkin . | |
| 4,118,774 | 10/1978 | Franke | 105/61 X |
| 4,344,364 | 8/1982 | Nickles et al. | 105/62 |
| 4,401,035 | 8/1983 | Sprigarelli et al. | 364/426 X |
| 4,633,193 | 12/1986 | Scordo | 327/159 X |
| 5,016,840 | 5/1991 | Bezos | 246/187 R |
| 5,304,955 | 4/1994 | Atriss et al. | 327/147 X |

*Primary Examiner*—Emanuel T. Voeltz
*Assistant Examiner*—Kamini Shah
*Attorney, Agent, or Firm*—James Ray & Associates

[57] ABSTRACT

In an electronically controlled RAILWAY locomotive throttle controller system having a central processor unit and a plurality of trainlines, such trainlines carrying binary voltage signals derived from corresponding binary signals in such central processor unit, a method for transmitting, for a group of said trainlines, herein numbered as NT, the binary voltage signals back to such central processor unit for diagnostic purposes. Such method includes the steps of applying, for the group of NT trainlines, their binary voltage signals to a frequency generator which will generate a signal having a frequency characteristic of such binary voltage signals. The frequency having a different value for every possible combination of binary signals from such trainlines. Transmitting such frequency signal back to the central processor unit and processing such frequency signal, in the central processor unit, to recover NT binary signals corresponding to such binary voltage signals on the trainlines in such group of trainlines.

20 Claims, 2 Drawing Sheets

5,581,472

METHOD AND APPARATUS FOR FEEDBACK OF TRAINLINE STATUS TO THE CENTRAL PROCESSOR OF A LOCOMOTIVE THROTTLE CONTROLLER

CROSS REFERENCE TO RELATED APPLICATIONS

The invention taught in this patent application is closely related to the inventions taught in the following co-pending patent applications:

Ser. No. 08/340,525 Electronically Controlled Locomotive Throttle Controller Including Remote Multiple Unit Throttle Control; Ser. No. 08/340,651 Method And Apparatus For Determining And Encoding The Position Of A Reverser Handle On A Locomotive Control Stand; Ser. No. 08/340,235 Digital Output Control Device and Method For Operating; Se. No. 08/340,215 Apparatus For Interlocking Throttle, Dynamic Brake And Reverser Handles On A Control Stand Of A Railway Locomotive; Ser. No. 08/340,652 Method Of Performing Diagnostics On An Electronically Controlled Railway Locomotive Throttle Controller; Ser. No. 08/340,237 Method Of Operating A Locomotive Mounted Throttle Controller Between Two Modes Of Operation Including A Transition Between Such Two Modes; Ser. No. 08/340,742 An Apparatus For And A Method Of Generating An Analog Signal For Control Of Dynamic Braking; Ser. No. 08/340,232 An Apparatus For Feedback Of An Analog Signal Used To Monitor And/Or Control Dynamic Braking And Method Of Operating; Ser. No. 08/340,213 An Apparatus To Enable Controlling A Throttle Controller From A Remote Host; Ser. No. 08/340,538 Apparatus For Interlocking Reverser Handle On A Control Stand Of A Railway Locomotive; and, Ser. No. 08/340,526 Apparatus For Determining The Absolute Position Of Throttle, Dynamic Brake And Reverser Handles On A Locomotive Control Stand.

Each of the above-referenced patent applications are being filed concurrently herewith and are assigned to the assignee of this invention.

Additionally, the teachings of each of these patent applications are incorporated herein by reference thereto.

FIELD OF THE INVENTION

The present invention relates, in general, to a locomotive mounted electronically operated throttle controller and, more particularly, this invention relates to a method and an apparatus for feedback of trainline status to the central processor unit of a locomotive throttle controller.

BACKGROUND OF THE INVENTION

Prior to the present invention, it is generally well known in the railway industry, that the throttle controller assemblies used in a railway type locomotive are almost exclusively of the mechanical type. These mechanical type locomotive throttle controller assemblies have normally utilized a number of mechanical devices in order to achieve actuation of the necessary microswitches and/or contacts. It is equally well known, for example, that cams are used extensively in this application in order to achieve the required actuation of the various microswitches and/or contacts disposed in the mechanical type throttle controller.

Such mechanical type throttle controllers which are presently being used on railway locomotives exhibit a number of relatively serious drawbacks and/or other limitations. These limitations have become more pronounced as the length of freight trains has grown in modern railroading, because the use of more and more locomotives are now required in a train consist in order to pull and/or push the added loads being hauled. For example, these mechanical type throttle controllers utilize either microswitches or contacts to control the voltage that is being applied to the trainline. The trainlines are electrical cables which carry high voltage, high power digital electrical signals which control throttle and reverse of a locomotive, as well as some other functions such as sand used to increase traction. Furthermore, there is no provision in these prior art mechanical throttle controllers for possible shut down of the system in the event of an output over current.

Additionally, these mechanical type throttle controllers are not equipped to provide the operator of the locomotive with any important feedback information and, consequently, they may not recognize a potential failure situation. Throttle controllers of the mechanical type also utilize either a resistive type voltage divider or a high power potentiometer in order to control the voltage and they are not equipped for shutdown of voltage regulation.

The prior art mechanical throttle controllers normally provide labels over each of the mechanical handles to convey only the position of the handle to the locomotive operator. However, these mechanical type throttle controllers are not equipped to display certain other relevant information, such as various diagnostic information, status information and/or warning type messages.

Furthermore, in a situation where it is either desirable or necessary to provide the required throttle control from a remote host over the communication lines, the currently used mechanical type throttle controllers require that a number of additional relays be used.

It can be seen from the above discussion of the prior art mechanical type throttle controller assemblies, presently used in the railroad industry, that there is an unfilled need which exists in the modern railroad industry for an improved railway locomotive type throttle controller assembly which will provide enhanced performance capability, additional functions which are not possible to accomplish with the prior art mechanical type throttle controllers and more consistent reliability. It is evident that this need has been addressed by each of the present invention and the closely related additional inventions which are being filed concurrently herewith.

SUMMARY OF THE INVENTION

In a first embodiment, the present invention provides in an electronically controlled locomotive throttle controller system having a central processor unit and a plurality of trainlines which carry binary voltage signals derived from corresponding binary signals in such central processor unit, a method for transmitting, for a group of such trainlines, herein numbered as NT, such binary voltage signals back to the central processor unit for diagnostic purposes. The central processor unit is a computer system which controls the throttle controller system. Such method includes the steps of applying, for such group of NT trainlines, their binary voltage signals to a frequency generator which generates a signal having a frequency which is characteristic of the binary voltage signals. Such frequency having a different value for every possible combination of binary signals from such trainlines and is herein referred to as a frequency signal. Transmitting such frequency signal back to the central processor unit and processing such frequency signal in the central processor unit to recover NT binary signals corresponding to the binary voltage signals on such trainlines in such group of trainlines.

In a second embodiment of the present invention, there is provided in an electronically controlled locomotive throttle controller system having a central processor unit and a plurality of trainlines which carry binary voltage signals derived from corresponding binary signals in such central processor unit, an apparatus for transmitting for a group of such trainlines, herein numbered as NT, the binary voltage signals back to such central processor unit for diagnostic purposes. The invented apparatus includes a frequency generator having means for receiving such binary voltage signals from the trainlines and generating a signal having a frequency characteristic of such binary voltage signals. The frequency having a different value for each of the possible combination of binary signals from such trainlines. This signal being herein referred to as a frequency signal. Such apparatus further includes a first means connected to such central processor unit for transmitting the frequency signal back to such central processor unit. The final essential component of this apparatus is a second means disposed in said microprocessor, for processing such frequency signal to recover NT binary signals corresponding to the binary voltage signals on the trainlines in such group of trainlines.

OBJECTS OF THE INVENTION

It is, therefore, one of the primary objects of the present invention to provide an apparatus for feedback of trainline status to the central processor unit of an electronically controlled railway locomotive type throttle controller which can be retrofitted onto an existing locomotive, regardless of the age of such locomotive, with relative ease.

Another object of the present invention is to provide a method and apparatus for feedback of trainline status to the central processor unit of an electronically controlled railway locomotive type throttle controller which provides additional desirable functions and capabilities for improved throttle control that are not possible in the mechanical type locomotive throttle controllers presently in use.

Still another object of the present invention is to provide a method and apparatus for feedback of trainline status to the central processor unit of an electronically controlled railway locomotive type throttle controller which, if desired, may have incorporated therein control capability from a remote host.

Yet another object of the present invention is to provide a method and apparatus for feedback of trainline status to the central processor unit of an electronically controlled railway locomotive type throttle controller which is significantly more reliable than presently used mechanical type throttle controllers.

It is an additional object of the to provide a method and apparatus for feedback of trainline status to the central processor unit of an electronically controlled railway locomotive type throttle controller which will operate effectively in the rather hostile environment found in a railway locomotive.

In addition to the various objects and advantages of the present invention described above, various other objects and advantages of the method and apparatus for feedback of trainline status to the central processor unit of an electronically controlled railway locomotive throttle controller will become more readily apparent to those persons who are skilled in the art from the following more detailed description of the invention, particularly, when such description is taken in conjunction with the attached drawing figures and with the appended claims.

Figure 1:
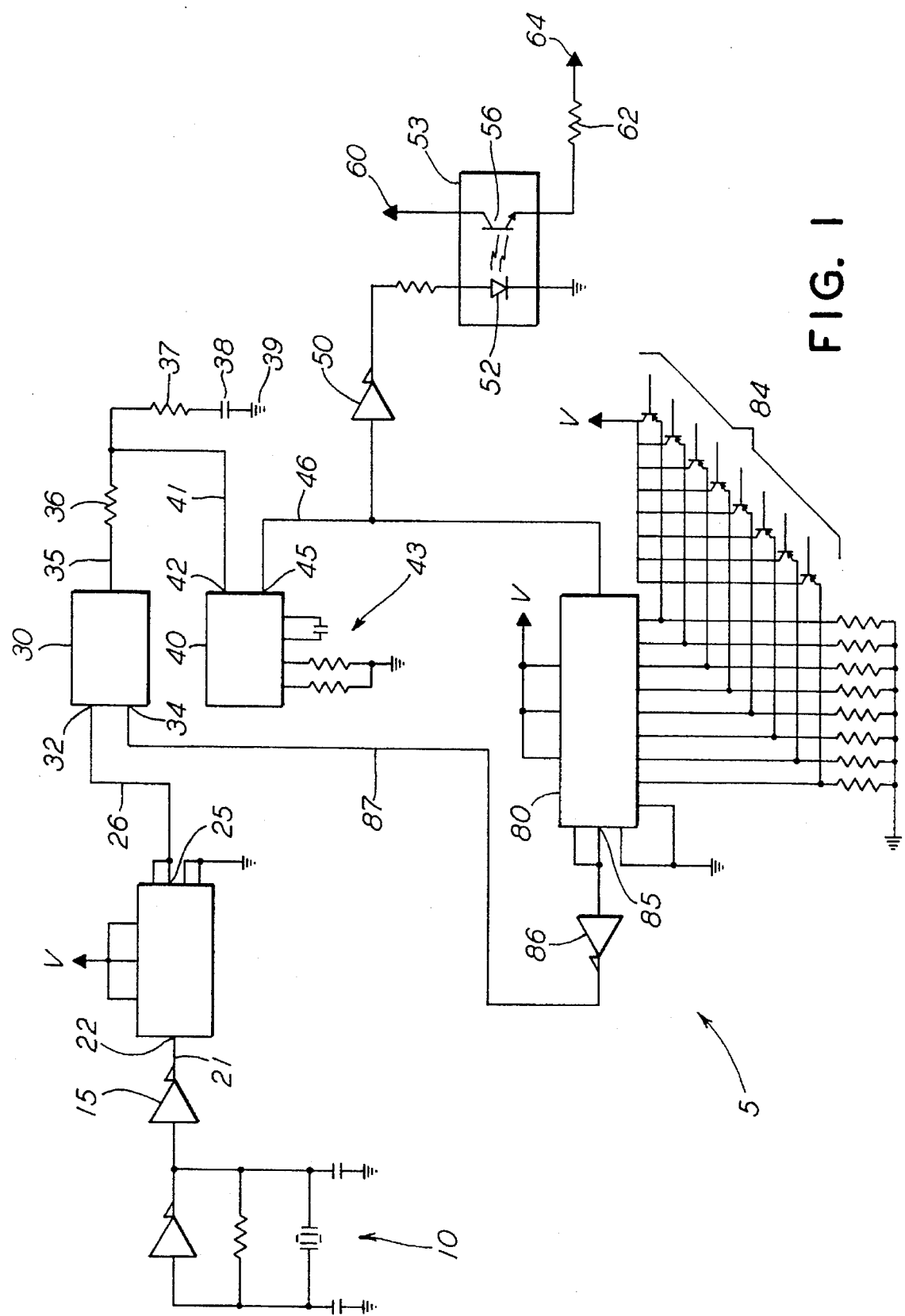
FIG. 1 is a diagram showing a circuit which converts a set of binary signals on the trainlines to a frequency signal.

BRIEF DESCRIPTION OF THE PRESENTLY PREFERRED AND VARIOUS ALTERNATIVE EMBODIMENTS OF THE INVENTION

According to the present invention there is provided a method, in an electronically controlled locomotive throttle controller system having a central processor unit and a plurality of trainlines carry binary voltage signals derived from corresponding binary signals in such central processor unit, for transmitting, for a group of such trainlines, hereinafter referred to as NT, these binary voltage signals back to such central processor unit for diagnostic purposes. The number of such trainlines in the group, NT, preferably equals 8.

The method includes the steps of applying for such group of NT trainlines their binary voltage signals to a frequency generator. The frequency generator generates a signal having a frequency characteristic of such binary voltage signals. Such frequency generated has a different value for every possible combination of binary signals from such trainlines. This signal being referred to hereinafter as a frequency signal.

Such frequency signal is transmitted back to the central processor unit and processed therein to recover NT binary signals corresponding to such binary voltage signals on the trainlines in such group of trainlines. This frequency signal may be transmitted back to the central processor unit by way of a wire pair, a wire having reference to a ground common with other circuits or an optical signal path, for example.

Preferably, there are a plurality of such frequencies generated, for various combinations of NT binary signals, and they are substantially equally spaced in frequency. More preferably, however, all but one of such frequencies generated for the various combinations of said NT binary signals are equally spaced in frequency. It is further desirable for the method to include the step of counting the number of pulses in such frequency signal which occur in a fixed time interval and the step of recognizing a frequency in excess of a fixed amount as corresponding to a certain binary number for such trainline voltage signals, wherein this binary number is one of: all high and all low.

The method, in the presently preferred embodiment, further includes the steps of generating a signal at a first, relatively high frequency, such first frequency being herein numbered as FH, preferably, FH is equal to about 32,768 Hz. Passing the signal at such first frequency, FH, to a first frequency divider, which divides it by a number herein referred to as NMAX, which NMAX number is preferably 256. The number NMAX equalling the number 2 exponentiated to the power of NT, thereby producing a signal at a frequency herein referred to as FL, which is the lowest frequency to be used. In the presently preferred embodiment of the invention FL is equal to about 128 Hz and FH/FL= NMAX. The signal at frequency FL is passed as a first input to a phase comparator. A voltage-controlled oscillator is provided which generates a signal at a frequency which depends on an analog voltage input. This signal being hereinafter referred to as a first adjustable-frequency signal. The first adjustable-frequency signal is communicated from such voltage-controlled oscillator to a second frequency divider which receives the binary voltage signals as inputs and processes these inputs to obtain the binary number corresponding to the set of NT binary signals, herein denoted as N, and divides such frequency of such first adjustable-frequency signal from the voltage-controlled oscillator by the number N to generate an output signal, hereinafter referred to as a second adjustable-frequency signal. The second adjustable-frequency signal is passed as a second input to such phase comparator. In such phase comparator the phase of such signal at frequency FL is compared with such second adjustable-frequency signal to generate a digital output voltage dependent upon whether the signal at frequency FL is advanced in phase compared to such second adjustable-frequency signal. Additionally, such digital output voltage from the phase comparator is filtered by a reactive element to obtain an analog voltage signal which is passed as input to such voltage-controlled oscillator. Such filtering is, preferably, achieved by one of attaching a capacitor, attaching an inductor, or attaching an inductor and a capacitor. The first adjustable-frequency signal, obtained from said voltage-controlled oscillator is used as the signal produced having a different value for every possible combination of binary signals from such trainlines.

Prior to proceeding to the more detailed description of the apparatus aspect of the present invention, it should be noted that throughout the drawing figures, identical components which have identical functions have been identified with identical reference numerals for the sake of clarity.

Reference is now directed to the drawing Figures. Illustrated therein is the presently preferred circuitry for an apparatus for transmitting for a group of trainlines, herein numbered as NT, binary voltage signals back to a central processor unit for diagnostic purposes. Such central processor unit is a part of a locomotive throttle controller system and a plurality of trainlines which carry binary voltage signals derived from corresponding binary signals in such central processor unit. The apparatus includes a frequency generator 5 for receiving such binary voltage signals 84 from the trainlines and generating a signal 64 having a frequency characteristic of such binary voltage signals. Such frequency has a different value for every possible combination of binary voltage signals 84 from the trainlines. This signal is herein referred to as a frequency signal. Additionally, it is preferred that such frequency generator 5 will generate frequencies, for various combinations of NT binary signals, which are substantially equally spaced in frequency and, further, wherein all but one of such frequencies generated, for such various combinations of NT binary signals, are substantially equally spaced in frequency.

The apparatus also includes a first means 64 connected to the central processor unit for transmitting such frequency signal back to the central processor unit and a second means 90, disposed in such central processor unit, for processing such frequency signal to recover NT binary signals 100 which correspond to such binary voltage signals 84 on the trainlines in such group of trainlines.

In the more preferred embodiment, the frequency generator 5 includes a fixed-frequency oscillator 10 which generates a signal at a first, relatively high, frequency, said first frequency being herein referred to as FH. The signal 21 is buffered and stabilized by amplifier 15. This signal enters a first frequency divider 20 at input 22. Frequency divider 20 receives such signal 21 and generates a signal at output 25. The frequency of signal 26 is equal to FH divided by a number herein referred to as NMAX, wherein NMAX equals the number 2 exponentiated to the power of NT, such second frequency being herein referred to as FL, which is the lowest frequency to be used.

Frequency generator 5 has a phase comparator 30 which receives such signal at frequency FL as a first input and a voltage-controlled oscillator 40 which generates a signal 46 at a frequency which depends on an analog voltage input. This signal being herein referred to as a first adjustable-frequency signal. There is a second frequency divider 80 which receives the first adjustable-frequency signal 46, and also receives the binary voltage signals from such trainlines 84. This second frequency divider processes such binary inputs to obtain the binary number corresponding to the set of NT binary signals, herein referred to as N, and generates a second adjustable-frequency signal 87 having a frequency equal to the frequency of such first adjustable-frequency signal 46 divided by (N+1).

The second adjustable frequency signal 87 is output from second frequency divider 80 at terminal 85. It is buffered and stabilized by amplifier 86.

There is a means for applying the second adjustable-frequency signal 87 to input 34 of phase comparator 30. Phase comparator 30 is further characterized as providing a digital output voltage 35 which is dependent upon whether the signal at frequency FL is advanced in phase compared to such second adjustable-frequency signal 46.

Frequency generator 5 further includes a means for filtering such digital output voltage 35 to obtain an analog voltage signal 41 and applying this analog voltage signal 41 as input 42 to such voltage-controlled oscillator 40 and a means for extracting such first adjustable-frequency signal 46 at output 45.

Figure 4:
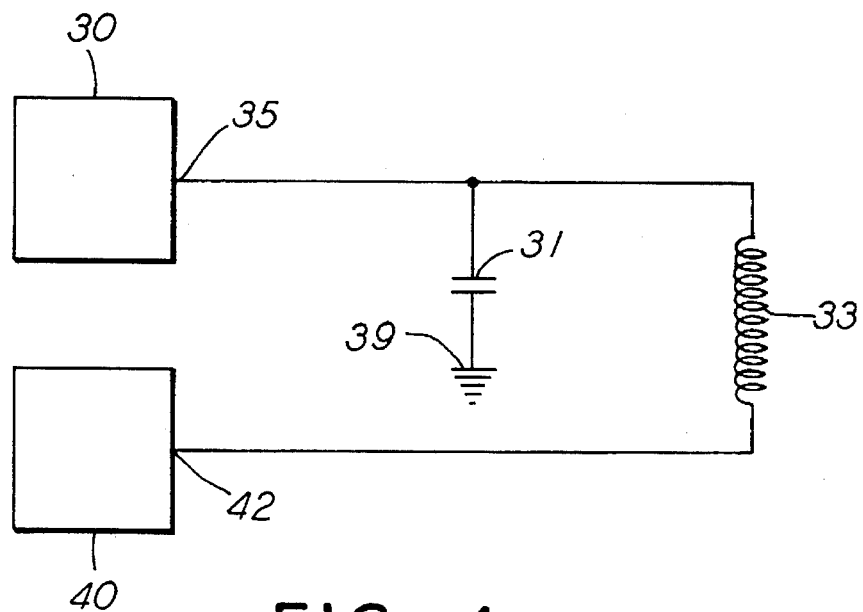
FIG. 4 shows an alternative configuration for the filter which converts the digital output voltage signal to an analog voltage signal.

In the embodiment shown in FIG. 1, this filter consists of resistors 36 and 37, and capacitor 38 connected to ground 39. FIG. 4 shows an alternative embodiment in which this filter includes capacitor 31 connected to ground 39, and inductor 33. A person skilled in the art will recognize that what is required is a low-pass filter, for which there are many alternatives.

A person skilled in the art will recognize that voltage controlled oscillator 40 requires tuning. Tuning is accomplished by external filtering elements, generally designated 43.

The output of the circuit shown in FIG. 1 is obtained from the first adjustable frequency signal 46, which is buffered and stabilized by amplifier 50, and used to energize the photoemitting side 52 of optical isolator 53. Power for the output frequency signal 64 is obtained from DC voltage source 60 and passed through the photoconductor side 56 of optical isolator 53. The feedback signal 64 is stabilized by resistor 62.

Figure 2:
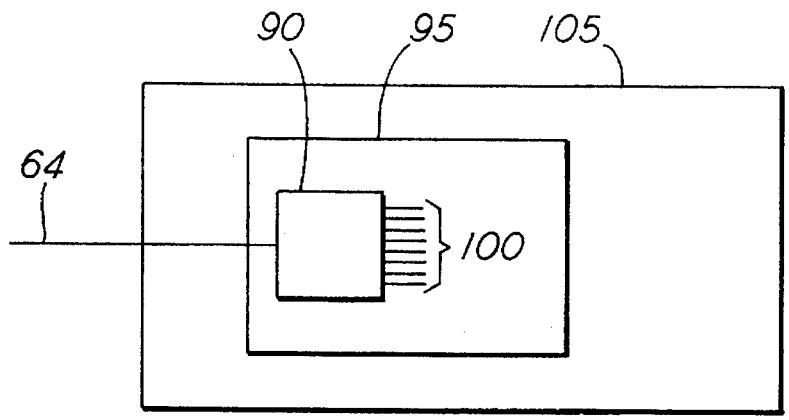
FIG. 2 is a diagram showing a circuit which converts a frequency signal to a set of binary signals in the central processor.

FIG. 2 shows pulse counter 90, which receives frequency signal 64, and counts the number of pulses of frequency signal 64 which occur in a predetermined time interval. The number of pulses is output from the counter 90 on digital lines 100 in the central processor unit 95. The central processor 95 is a part of the locomotive throttle controller 105.

Figure 3:
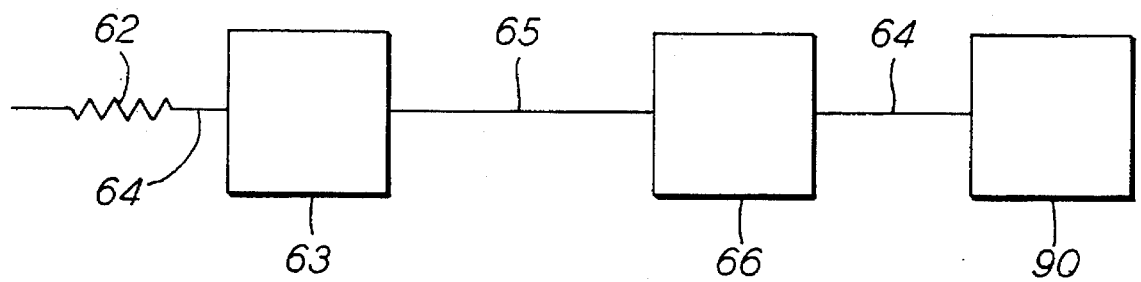
FIG. 3 shows an optical signal path used to convey the frequency signal back to the central processor in an alternative embodiment.

FIG. 3 shows an embodiment in which frequency signal 64 is communicated to pulse counter 90 by an optical signal path 65. Modulated light source 63 receives signal 64 and produces an optical signal on optical signal path 65. The modulated light is converted to an electrical signal in photodetector 66 and communicated to pulse counter 90.

Preferably, a frequency in excess of a fixed amount will be recognized by the frequency counter or by the central processor unit as corresponding to a certain binary number which is either all high or all low.

While a presently preferred and various other alternative embodiments of the instant invention have been described in considerable detail above, with particular reference to the attached drawing figure, it should be understood that various additional adaptations and modifications of the method and apparatus for feedback of trainline status to the central processor unit of an electronically controlled railway locomotive throttle controller assembly can be both envisioned and made by those persons who are skilled in the railway electronics control art without departing from the spirit or scope of the appended claims.

We claim:

1. In an electronically controlled locomotive throttle controller system having a central processor unit and a plurality of trainlines, such trainlines carrying binary voltage signals derived from corresponding binary signals in such central processor unit, a method for transmitting, for a group of such trainlines, herein numbered as NT, such binary voltage signals back to such central processor unit for diagnostic purposes, said method comprising the steps of:

(a) applying, for such group of NT trainlines, their such binary voltage signals to a frequency generator which generates a signal having a frequency characteristic of such binary voltage signals, said frequency having a different value for every possible combination of binary signals from such trainlines, said signal being herein referred to as a frequency signal;

(b) transmitting said frequency signal back to such central processor unit, said transmitting accomplished using one of a wire pair, a wire having reference to a ground common with other circuits, and an optical signal path; and (c) processing said frequency signal, in such central processor unit, to recover NT binary signals corresponding to said binary voltage signals on such trainlines in said group of trainlines, and making said binary signals available for diagnostic purposes in said central processor unit.

2. A method, according to claim 1, wherein Step is further characterized in that a plurality of said frequencies generated, for various combinations of such NT binary signals, are equally spaced in frequency.

3. A method, according to claim 2, further characterized in that all but one of said frequencies generated, for various combinations of such NT binary signals, are equally spaced in frequency.

4. A method, according to claim 1, wherein Step (a) includes the steps of:

(a) generating a signal at a first, relatively high frequency, said first frequency being herein numbered as FH;

(b) passing said signal at said first frequency, FH, to a first frequency divider, which divides it by a number herein referred to as NMAX, said number NMAX equalling the number 2 exponentiated to the power of NT, thereby producing a signal at a frequency herein referred to as FL, which is the lowest frequency to be used;

(c) passing said signal at frequency FL as a first input to a phase comparator;

(d) providing a voltage-controlled oscillator which generates a signal at a frequency which depends on an analog voltage input, said signal being herein referred to as a first adjustable-frequency signal;

(e) sending said first adjustable-frequency signal from said voltage-controlled oscillator to a second frequency divider which receives such binary voltage signals as inputs, processes such inputs to obtain a binary number corresponding to said set of NT binary signals, herein denoted as N, divides said frequency of said first adjustable-frequency signal from said voltage-controlled oscillator by said number N to generate an output signal, herein referred to as a second adjustable-frequency signal, which is passed as a second input to said phase comparator;

(f) comparing a phase of said signal at frequency FL with said second adjustable-frequency signal in said phase comparator to generate a digital output voltage dependent upon whether said signal at frequency FL is advanced in phase compared to said second adjustable-frequency signal;

(g) filtering said digital output voltage from said phase comparator by a reactive element to obtain an analog voltage signal which is passed as input to said voltage-controlled oscillator; and (h) using said first adjustable-frequency signal, obtained from said voltage-controlled oscillator as a signal produced having a different value for every possible combination of binary signals from such trainlines.

5. A method, according to claim 1, wherein Step (c) includes the step of counting a number of pulses in said frequency signal which occur in a fixed time interval.

6. A method, according to claim 1, wherein Step (c) includes the step of recognizing a frequency in excess of a fixed amount as corresponding to a certain binary number for such trainline voltage signals, wherein said binary number is one of all high and all low.

7. A method, according to claim 1, wherein a number of such trainlines in such group, NT, equals 8.

8. A method, according to claim 4, wherein said NMAX equals 256.

9. A method, according to claim 4, wherein FH is equal to about 32,768 Hz.

10. A method, according to claim 4, wherein FL is equal to about 128 Hz.

11. A method, according to claim 4, wherein FH/FL= NMAX.

12. A method, according to claim 4, wherein the filtering in Step (g) is accomplished by one of: attaching a capacitor, attaching an inductor, attaching an inductor and a capacitor.

13. In a locomotive throttle controller system having a central processor unit and a plurality of trainlines, such trainlines carrying binary voltage signals derived from corresponding binary signals in such central processor, an apparatus for transmitting for a group of such trainlines, herein numbered as NT, such binary voltage signals back to such central processor unit for diagnostic purposes, which comprises:

(a) a frequency generator having means for receiving such binary voltage signals from such trainlines and generating a signal having a frequency characteristic of such binary voltage signals, said frequency having a different value for every possible combination of binary signals from such trainlines, said signal being herein referred to as a frequency signal;

(b) a first means connected to such central processor unit for transmitting said frequency signal back to such central processor unit, said first means is one of a wire pair, a wire having reference to a ground common with other circuits, and an optical signal path; and (c) a second means disposed in such central processor unit, for processing said frequency signal to recover NT binary signals corresponding to such binary voltage signals on such trainlines in such group of trainlines.

14. An apparatus, according to claim 13, wherein said frequency generator generates frequencies, for various combinations of NT binary signals, which are substantially equally spaced in frequency.

15. An apparatus, according to claim 14, wherein all but one of said frequencies generated, for said various combinations of NT binary signals, are substantially equally spaced in frequency.

16. An apparatus, according to claim 13, wherein said frequency generator comprises:

(a) a fixed-frequency oscillator which generates a signal at a first, relatively high, frequency, said first frequency being herein referred to as FH;

(b) a first frequency divider, which receives said signal at said first frequency and generates a signal with a second frequency equal to FH divided by a number herein referred to as NMAX, wherein NMAX equals the number 2 exponentiated to the power of NT, said second frequency being herein referred to as FL, which is the lowest frequency to be used;

(c) a phase comparator which receives said signal at frequency FL as a first input;

(d) a voltage-controlled oscillator which generates a signal at a frequency which depends on an analog voltage input, said signal being herein referred to as a first adjustable-frequency signal;

(e) a second frequency divider which receives said first adjustable-frequency signal, and also receives such binary voltage signals from such trainlines, processes such binary inputs to obtain the binary number corresponding to such set of NT binary signals, herein referred to as N, and generates a second adjustable-frequency signal having a frequency equal to the frequency of said first adjustable-frequency signal divided by N;

(f) means for applying said second adjustable-frequency signal as a second input to said phase comparator, said phase comparator being further characterized as providing a digital output voltage dependent upon whether said signal at frequency FL is advanced in phase compared to said second adjustable-frequency signal;

(g) means for filtering said digital output voltage to obtain an analog voltage signal and applying said analog voltage signal as input to said voltage-controlled oscillator; and (h) means for extracting said first adjustable-frequency signal and using it as said frequency signal in claim 14, Item 1.

17. An apparatus, according to claim 13, wherein said second means processes said frequency signal by counting a number of pulses in said frequency signal which occur in a fixed time interval.

18. An apparatus, according to claim 13, wherein said second means recognizes a frequency in excess of a fixed amount as corresponding to a certain binary number for such trainline voltage signals, where said binary number is one of: all high and all low.

19. An apparatus, according to claim 16, wherein said FH/FL=said NMAX.

20. An apparatus, according to claim 16, wherein said means for filtering comprises one of: a capacitor, an inductor, an inductor and a capacitor.

* * * * *

UNITED STATES PATENT AND TRADEMARK OFFICE
CERTIFICATE OF CORRECTION

PATENT NO. : 5,581,472
DATED : December 3, 1996
INVENTOR(S) : Craig A. Miller, et al.

It is certified that error appears in the above-identified patent and that said Letters Patent is hereby corrected as shown below:

Column 3, line 59, after "the", please insert --present invention--.

Column 6, line 9, please delete "The" and insert --This--.

Column 7, line 54, after "Step", please insert --(a)--.

Column 10, line 24, please delete "14" and insert --13--.

Signed and Sealed this

Twenty-third Day of June, 1998

Attest:

BRUCE LEHMAN

*Attesting Officer*  *Commissioner of Patents and Trademarks*